US008884218B2

(12) United States Patent
Yamaguchi

(10) Patent No.: US 8,884,218 B2
(45) Date of Patent: Nov. 11, 2014

(54) METHOD AND SYSTEMS FOR MASS SPECTROMETRY FOR IDENTIFICATION AND STRUCTURAL ANALYSIS OF UNKNOWN SUBSTANCE

(75) Inventor: Shinichi Yamaguchi, Kyoto (JP)

(73) Assignee: Shimadzu Corporation, Kyoto-Shi (JP)

( * ) Notice: Subject to any disclaimer, the term of this patent is extended or adjusted under 35 U.S.C. 154(b) by 0 days.

(21) Appl. No.: 13/981,833

(22) PCT Filed: Jan. 31, 2011

(86) PCT No.: PCT/JP2011/051861
§ 371 (c)(1), (2), (4) Date: Jul. 25, 2013

(87) PCT Pub. No.: WO2012/104956
PCT Pub. Date: Aug. 9, 2012

(65) Prior Publication Data

US 2013/0306857 A1 Nov. 21, 2013

(51) Int. Cl.
*H01J 49/04* (2006.01)
*H01J 49/26* (2006.01)
*G01N 27/62* (2006.01)
*H01J 49/00* (2006.01)
*H01J 49/02* (2006.01)

(52) U.S. Cl.
CPC ........... *H01J 49/0036* (2013.01); *H01J 49/022* (2013.01); *H01J 49/004* (2013.01)
USPC ........... 250/282; 250/281; 250/283; 250/288; 250/292; 702/27; 702/23; 702/22; 702/81; 702/30

(58) Field of Classification Search
CPC .............. H01J 49/0036; H01J 49/0027; H01J 49/0031; H01J 49/004; H01J 49/0081; H01J 49/04; H01J 49/0045; H01J 49/26; G01N 27/65; G01N 33/6848
USPC ................. 250/281, 282, 283, 288, 292, 286, 250/252.1; 702/27, 23, 22, 81, 30, 32
See application file for complete search history.

(56) References Cited

U.S. PATENT DOCUMENTS 6,745,134 B2 * 6/2004 Kobayashi et al. ............. 702/27
6,907,352 B2 * 6/2005 Yoshinari et al. ............... 702/23
(Continued)

FOREIGN PATENT DOCUMENTS

EP 1376651 A2 1/2004
EP 1429145 A1 6/2004
(Continued)

OTHER PUBLICATIONS

International Search Report mailed May 10, 2011 for International Application No. PCT/JP2011/051861 (5 pages).

(Continued)

*Primary Examiner* — David A Vanore
(74) *Attorney, Agent, or Firm* — Bingham McCutchen LLP

(57) ABSTRACT

A molecular weight is determined from an actually measured mass spectrum of a target substance, and a database search is performed to extract candidates of a chemical structural formula corresponding to the molecular weight (S2, S3). By using an algorithm for predicting a dissociation pattern, product ions to be produced by a dissociating operation are predicted for each candidate of the chemical structural formula (S4). The predicted pattern of the product ions is compared with an actually measured $MS^2$ spectrum, and a degree of similarity representing the degree of matching of the pattern is calculated (S5). When there are a plurality of candidates of the chemical structural formula, the candidates are displayed in order of their degrees of similarity (S6).

12 Claims, 5 Drawing Sheets

(56) References Cited

U.S. PATENT DOCUMENTS

| | | | | |
|---|---|---|---|---|
| 6,917,037 | B2 * | 7/2005 | Ootake et al. | 250/282 |
| 6,957,159 | B2 * | 10/2005 | Kobayashi et al. | 702/81 |
| 7,485,852 | B2 * | 2/2009 | Yamashita et al. | 250/282 |
| 7,544,931 | B2 * | 6/2009 | Yamaguchi et al. | 250/282 |
| 7,595,484 | B2 * | 9/2009 | Yokosuka et al. | 250/282 |
| 7,763,846 | B2 * | 7/2010 | Yamaguchi et al. | 250/281 |
| 8,026,476 | B2 * | 9/2011 | Yamaguchi | 250/282 |
| 8,168,943 | B2 * | 5/2012 | Schwartz et al. | 250/282 |
| 8,180,576 | B2 * | 5/2012 | Yamaguchi | 702/22 |
| 2001/0007349 | A1 | 7/2001 | Nagai | |
| 2004/0111228 | A1 * | 6/2004 | Kobayashi et al. | 702/81 |
| 2004/0181347 | A1 * | 9/2004 | Yoshinari et al. | 702/27 |
| 2008/0067344 | A1 * | 3/2008 | Yamaguchi et al. | 250/282 |
| 2008/0121793 | A1 * | 5/2008 | Yamaguchi et al. | 250/282 |
| 2013/0282304 | A1 * | 10/2013 | Kozawa | 702/27 |

FOREIGN PATENT DOCUMENTS

| | | | |
|---|---|---|---|
| EP | 1447833 | A2 | 8/2004 |
| JP | 8-124519 | A | 5/1996 |
| JP | 1164285 | | 5/1999 |
| JP | 2001249114 | A | 9/2001 |
| JP | 200428782 | | 1/2004 |
| JP | 2004191077 | A | 7/2004 |
| JP | 2004245699 | A | 9/2004 |
| JP | 2009-210305 | A | 9/2009 |
| WO | 2008/059567 | A1 | 5/2008 |

OTHER PUBLICATIONS

Examination Report in Japanese Patent Application No. 2012-555584, mailed on Mar. 18, 2014, 8 pages (4 pages of English Translation and 4 pages of Official Copy).

PCT International Application No. PCT/JP2011/051861, International Written Opinion mailed on May 10, 2011, 16 pages (10 pages of English Translation and 6 pages of Official Copy).

PCT International Application No. PCT/JP2011/051861, International Preliminary Report on Patentability mailed on Aug. 15, 2013, 19 pages (11 pages of English Translation and 7 pages of Official copy).

* cited by examiner

METHOD AND SYSTEMS FOR MASS SPECTROMETRY FOR IDENTIFICATION AND STRUCTURAL ANALYSIS OF UNKNOWN SUBSTANCE

TECHNICAL FIELD

The present invention relates to a method and system for mass spectrometry for performing the identification and/or structural analysis of an unknown substance by using a mass spectrometer capable of an $MS^n$ analysis (where n is an integer equal to or greater than two).

BACKGROUND ART

In the field of mass spectrometry using an ion trap mass spectrometer or other apparatuses, a technique called the MS/MS analysis (tandem analysis) is commonly known. In a typical MS/MS ($=MS^2$) analysis, an ion having a specific mass-to-charge ratio (m/z) of interest is selected as a precursor ion from an object to be analyzed. The selected precursor ion is dissociated by collision induced dissociation (CID) to produce one or a plurality of product ions. The pattern of dissociation depends on the structure of the original compound. Accordingly, it is possible to identify the target compound and/or grasp its chemical structure by performing a mass spectrometry of the product ions produced by the dissociation and analyzing the thereby obtained $MS^2$ spectrum. If the ion cannot be dissociated into sufficiently small mass-to-charge ratios by only one stage of the dissociating operation, an $MS^n$ analysis may be performed, in which the dissociating operation is repeated a plurality of times, and the eventually obtained fragment ions are subjected to a mass spectrometry.

In a molecule identification method described in Patent Document 1, in the process of identifying an unknown compound or deducing its chemical structure from data obtained by the aforementioned $MS^n$ analysis ($MS^n$ spectrum data), a database search is performed with reference to a database (or library) in which spectrum patterns, fragment structures and other information are previously registered. However, to use such a technique, a database of $MS^n$ spectra must be prepared beforehand.

In recent years, liquid chromatograph mass spectrometers (LC/MSs) consisting of a liquid chromatograph (LC) coupled with an $MS^2$ (or $MS^n$) mass spectrometer have been commercially available in large numbers and are widely used in various fields. However, the amount of $MS^n$ spectrum databases for such systems is far from adequate. One of the reasons for this situation is that LC/MS is capable of observing an enormous number of molecular species (several millions) and it is difficult to create an $MS^n$ spectrum database which exhaustively covers such an enormous number of molecular species. Another reason for the difficulty in creating the database is that, in a measurement by LC/MS, even if the substance is the same, the pattern of dissociation easily changes depending on the analyzing conditions (e.g. the type of mobile phase in the LC, the ionization method, the ionizing conditions or the CID conditions) as well as the system configuration, which leads to a significant difference in the peak pattern of the $MS^n$ spectrum.

Due to such reasons, identifying a substance using a database search for $MS^n$ spectra has been difficult for LC/MS, and especially for a system using an $MS^n$ mass spectrometer. Even if such identification is possible, the kinds of identifiable substances are considerably limited. Thus, in an $MS^n$ analysis using an LC/MS, the database search for an $MS^n$ spectrum has been practically unavailable for the identification of a completely unknown substance.

BACKGROUND ART DOCUMENT

Patent Document

Patent Document 1: U.S. Pat. No. 7,197,402 B2

SUMMARY OF THE INVENTION

Problem to be Solved by the Invention

The present invention has been developed to solve the previously described problems. Its objective is to provide a method and system for mass spectrometry capable of the identification and/or structural analysis of a substance with a high level of accuracy based on mass spectrometric data collected by an $MS^n$ analysis even if no adequate $MS^n$ spectrum database is available.

Means for Solving the Problems

The first aspect of the present invention aimed at solving the aforementioned problem is a method for mass spectrometry for the identification and/or structural analysis of an unknown substance using a mass spectrometer capable of obtaining an $MS^n$ spectrum by performing an $MS^n$ analysis in which an ion originating from a substance to be analyzed is dissociated in n-1 stages (where n is an integer equal to or greater than two), including:

a) a structural formula deduction step, in which a chemical structural formula of an unknown substance is deduced based on the molecular weight of the unknown substance determined from a mass spectrum obtained by performing a mass spectrometry of the unknown substance or on a composition formula deduced from the molecular weight;

b) a dissociation state deduction step, in which a product ion to be detected in an $MS^n$ analysis of the unknown substance is deduced by predicting a dissociation pattern of an ion originating from the unknown substance based on the chemical structural formula deduced in the structural formula deduction step; and c) an evaluation step, in which a spectrum pattern formed by the product ion deduced in the dissociation state deduction step and the $MS^n$ spectrum obtained by performing an $MS^n$ analysis of the unknown substance are compared, and the degree of reliability of the deduction of the chemical structural formula by the structural formula deduction step is evaluated based on the similarity between the spectrum pattern and the $MS^n$ spectrum.

The second aspect of the present invention aimed at solving the aforementioned problem is a system for carrying out the method for mass spectrometry according to the first aspect of the present invention. That is to say, it is a mass spectrometer capable of obtaining an $MS^n$ spectrum by performing an $MS^n$ analysis in which an ion originating from a substance to be analyzed is dissociated in n-1 stages (where n is an integer equal to or greater than two), and in which the identification and/or structural analysis of an unknown substance is performed by using a mass spectrum obtained by a mass spectrometry of the unknown substance and an $MS^n$ spectrum obtained by performing an $MS^n$ analysis of the same unknown substance, including:

a) a structural formula deduction unit for deducing a chemical structural formula of an unknown substance based on the molecular weight of the unknown substance determined from a mass spectrum obtained by an actual measurement of the unknown substance or on a composition formula deduced from the molecular weight;

b) a dissociation state deduction unit for deducing a product ion to be detected in an $MS^n$ analysis of the unknown substance, by predicting a dissociation pattern of an ion originating from the unknown substance based on the chemical structural formula deduced by the structural formula deduction unit; and c) an evaluation unit for comparing a spectrum pattern formed by the product ion deduced by the dissociation state deduction unit and an $MS^n$ spectrum obtained by an actual measurement of the unknown substance, and for evaluating the degree of reliability of the deduction of the chemical structural formula by the structural formula deduction unit, based on the similarity between the spectrum pattern and the $MS^n$ spectrum.

As one mode of the present invention, in the structural formula deduction step, a database having chemical structural information of various compounds registered therein is used to determine the chemical structural formula corresponding to the molecular weight or the composition formula of the unknown substance. Structural information databases are offered from various organizations and institutions, providing extensive and enriched information about an enormous number of compounds. Using such databases facilitates the deduction of a chemical structural formula from a target molecular weight or composition formula. If it is previously known that the addition or elimination of specific components or groups easily occurs, it is preferable to prepare a list of possible structural changes and extend the scope of search so as to cover chemical structural formulae that can be created by causing the listed structural changes on the chemical structural formulae of the compounds registered in the databases. This improves the probability that a more appropriate chemical structural formula is deduced.

In general, the molecular weight of one compound determined from a mass spectrum inevitably has a certain numerical width due to the limitation of the mass accuracy in the mass spectrometer. On the other hand, it is often the case that a plurality of different compounds have close molecular weights. Accordingly, in many cases, a plurality of chemical structural formulae including those which are different from the actual chemical structural formula will be presented as candidates for an unknown substance.

In the dissociation state deduction step, a dissociation pattern of an ion originating from an unknown substance concerned is predicted based on the chemical structural formula deduced from the molecular weight or other information in the previously described manner. If there are a plurality of candidates of the chemical structural formula, the dissociation pattern is predicted for each candidate. For such a prediction, existing software products can be conveniently used (for example, "ACD/MS Manager" or "ACD/MS Fragmenter" manufactured by Advanced Chemistry Development, Inc.) Base on the prediction result of the dissociation pattern, a product ion or ions to be detected in an $MS^n$ analysis are deduced. It is not always the case that a single dissociation pattern is predicted from one chemical structural formula.

In the evaluation step, the spectrum pattern formed by the product ion or ions deduced from the predicted dissociation pattern and the $MS^n$ spectrum obtained by an actual measurement of the unknown substance are compared. Then, for example, a degree of similarity between the spectrum pattern and the $MS^n$ spectrum is calculated, and the reliability of the deduction of the original chemical structural formula is evaluated according to the degree of similarity. For example, if there are a plurality of candidates of the chemical structural formula, the degree of similarity is determined for each candidate, and the order of the reliabilities of the candidates is determined according to their degrees of similarity. The result of evaluation is presented, for example, on a screen of a display unit. By visually checking it, analysis operators can identify the unknown substance or grasp its structure.

If none of the candidates of the chemical structural formula has a high degree of similarity (for example, if all the values are below a specified threshold), or if there is no significant difference in the degree of similarity among the candidates and it is difficult to select a candidate, an $MS^n$ analysis with an increased value of n can be used. For example, if it is impossible to select an appropriate candidate based on the degree of similarity derived from the result of a comparison between the spectrum pattern formed by the product ions based on the prediction of a single-stage dissociation pattern and the $MS^2$ spectrum obtained by an $MS^2$ analysis, a spectrum pattern formed by the product ions based on the prediction of a two-stage dissociation pattern can be compared with an $MS^3$ spectrum obtained by an $MS^3$ analysis to determine the degree of similarity, and the order of the candidates can be determined by using this degree of similarity.

The use of the $MS^n$ analysis with an increased value of n is not limited to the case where none of the candidates of the chemical structural formula has a high degree of similarity or the case where there is no significant difference in the degree of similarity among the candidates and it is difficult to select a candidate. That is to say, the degree of similarity determined by comparing the spectrum pattern formed by the product ions based on the prediction of the dissociation pattern with an increased value of n and an $MS^n$ spectrum obtained by an actual $MS^n$ analysis can be used for the verification of the evaluation of the reliability of the previously conducted deduction of the chemical structural formula. This verification further improves the reliability of identification or structural deduction.

The third aspect of the present invention aimed at solving the aforementioned problem is a method for mass spectrometry for the identification and/or structural analysis of an unknown substance using a mass spectrometer capable of obtaining an $MS^n$ spectrum by performing an $MS^n$ analysis in which an ion originating from a substance to be analyzed is dissociated in n-1 stages (where n is an integer equal to or greater than two), including:

a) a virtual database creation step, in which a dissociation pattern is predicted based on each of a plurality of chemical structural formulae of various kinds of substances to determine an $MS^n$ spectrum to be obtained as a result of an $MS^n$ analysis of each substance, and the obtained $MS^n$ spectrum is held in a database; and b) a candidate extraction step, in which the spectrum pattern of an $MS^n$ spectrum obtained by performing an $MS^n$ analysis of an unknown substance is compared with a virtual database held by the virtual database creation step under a previously set refinement condition, and a chemical structural formula having a high degree of similarity is extracted as an identification candidate of the unknown substance.

The fourth aspect of the present invention aimed at solving the aforementioned problem is a system for carrying out the method for mass spectrometry according to the first aspect of the present invention. That is to say, it is a mass spectrometer capable of obtaining an $MS^n$ spectrum by performing an $MS^n$ analysis in which an ion originating from a substance to be analyzed is dissociated in n-1 stages (where n is an integer equal to or greater than two), and in which the identification and/or structural analysis of an unknown substance is performed by using a mass spectrum obtained by a mass spectrometry of the unknown substance and an $MS^n$ spectrum obtained by performing an $MS^n$ analysis of the same unknown substance, including:

a) a virtual database creator for predicting a dissociation pattern based on each of a plurality of chemical structural formulae of various kinds of substances to determine an $MS^n$ spectrum to be obtained as a result of an $MS^n$ analysis of each substance, and for holding the obtained $MS^n$ spectrum in a database; and b) a candidate extractor for comparing the spectrum pattern of an $MS^n$ spectrum obtained by performing an $MS^n$ analysis of an unknown substance, with a virtual database held by the virtual database creator, under a previously set refinement condition, and for extracting, as an identification candidate of the unknown substance, a chemical structural formula having a high degree of similarity.

In the first and second aspects of the present invention, the dissociation pattern of an ion originating from an unknown substance is predicted based on a chemical structural formula deduced from the result of an actual measurement of the unknown substance, and based on the prediction, an $MS^n$ spectrum which is expected to be obtained by an $MS^n$ analysis is derived. By contrast, in the third and fourth aspects of the present invention, the dissociation pattern is predicted beforehand for each of various kinds of chemical structural formulae, without relying on actual measurements. Then, based on the prediction, an $MS^n$ spectrum which is expected to be obtained by an $MS^n$ analysis is derived, and a virtual database of $MS^n$ spectra is created. This database is described as "virtual" because it does not rely on actual measurements, unlike commonly used spectrum databases which are based on the results of actual measurements.

In the candidate extraction step, when the spectrum pattern of an $MS^n$ spectrum obtained as a result of an $MS^n$ analysis of the unknown substance is given, a pattern matching with the spectrum patterns held in the virtual database is performed under a previously set refinement condition. Then, an $MS^n$ spectrum having a high degree of similarity is identified, and the chemical structural formula from which that spectrum has been derived is extracted as an identification candidate of the unknown substance.

In this candidate extraction step, for example, it is preferable to compare an $MS^n$ spectrum held in the virtual database and an $MS^n$ spectrum obtained by an actual measurement of the unknown substance, to calculate a degree of similarity between the two $MS^n$ spectra, and to determine the order of reliabilities of a plurality of candidates according to their degrees of similarity, under a previously set refinement condition. The result of evaluation can be presented, for example, on a screen of a display unit, so as to allow analysis operators to visually check it and identify the unknown substance or grasp its structure.

As one mode of the method for mass spectrometry according to the third aspect of present invention, in the virtual database creation step, a database having chemical structural information of various compounds registered therein is used in such a manner that an $MS^n$ spectrum pattern is predicted for each compound registered in the database, and the virtual database is created using the predicted spectrum. As already noted, structural information databases are offered from various organizations and institutions, providing extensive and enriched information about an enormous number of compounds. Creating the virtual database based on these existing databases enriches the virtual database itself.

In the virtual database creation step, the virtual database can be created independently, i.e. separately from an existing, original database in which chemical structural information of various compounds is registered. However, it is also possible to additionally register, in the original database, the $MS^n$ spectrum pattern predicted for each compound and/or information obtained from the spectrum pattern (e.g. only the mass-to-charge ratios of product ions) and relate the added information to the original compound, while keeping the information in the original database intact. The result is a virtual database added to the original database. In general, an original database used in a mass spectrometry has chemical structural information and $MS^2$ spectra (or mass spectra in a fragmented state) of various compounds registered therein. Those $MS^2$ spectra or mass spectra are obtained by actual measurements, and therefore, may have in some cases a low mass accuracy. By contrast, an $MS^n$ spectrum predicted from a composition formula of a compound in the previously described manner has the accuracy of theoretical value. Adding $MS^n$ spectra of such high accuracies to the original database makes it possible to specify a highly accurate value of mass-to-charge ratio as an input for a database search.

A non mass-spectrometric database can also be used as the original database as long as chemical structural information of the compounds is registered in it. In such an original database, the virtual database can be created by additionally registering, for each compound, a predicted $MS^n$ spectrum pattern or information derived from the spectrum pattern.

The $MS^n$ spectra stored in the virtual database are spectra obtained by calculations on the assumption that various chemical structures will be dissociated according to a predicted dissociation pattern. In other words, they are not spectra obtained by actual measurements. Therefore, even such $MS^n$ spectra that cannot be actually measured due to various conditions or restrictions, or that are difficult to observe by actual measurements, can also be included in the virtual database, increasing the number of kinds of $MS^n$ spectra accordingly. This lowers the probability of being unable to identify the compound or the probability of making incorrect identification due to the absence of a corresponding identification candidate in the candidate extraction process.

Similar to the first and second aspects of the present invention, an existing software product can preferably be used for the prediction of the dissociation pattern in the virtual database creation step (e.g. the aforementioned "ACD/MS Manager" or "ACD/MS Fragmenter" manufactured by Advanced Chemistry Development, Inc.)

Even in the case of comparing $MS^2$ spectra, it is preferable, in the virtual database creation step, to predict the dissociation pattern of not only the single-stage dissociation but also the dissociation occurring in two or more stages, and to store an $MS^n$ spectrum based on that prediction in the virtual database. In an actual dissociation of an ion, a single dissociating operation may cause two or more stages of consecutive dissociations under some conditions. Even if two or more stages of dissociations have unintentionally occurred, it is possible to search for the spectrum pattern of the product ions produced by the dissociations if a virtual database is created beforehand in the aforementioned manner.

In general, since there are a number of dissociation patterns predictable for one chemical structure, the total number of $MS^n$ spectra to be stored in the virtual database will be enormous. There is also the case where two similar $MS^n$ spectra are respectively derived from two compounds having completely different chemical structures. Accordingly, it is preferable to appropriately set refinement conditions in order to reduce the required time for the database search as well as to avoid incorrect identification as much as possible.

Specific examples of the refinement conditions include the isotope distribution, a partial composition formula or structural formula, the kinds and numbers of constituent elements, and a mass defect filter. For a system having a liquid chromatograph or gas chromatograph connected to the inlet side of the mass spectrometer, the elution time (retention time) in the chromatograph may also be used as a refinement condition.

A piece of information obtained by a measurement using an analyzing apparatus different from mass spectrometers may also be used as a refinement condition, such as the acid dissociation constant (pKa), the water/octanol partition coefficient under neutral condition (LogP), the water/octanol partition coefficient at each pH (LogD), and other physical properties. Combining a plurality of refinement conditions is also naturally possible.

If any of the aforementioned physical properties is stored as an item of information related to each compound in the original database, it is possible to narrow the scope of search by comparing an actually measured value of that physical property of the unknown substance and the value of that physical property stored in the original database. Even if no such physical property value is stored as an item of information in the original database, it is still possible to calculate various physical properties from structural formulae by commonly known calculation methods and to compare actually measured values of the physical properties of an unknown substance with the calculated values of the physical properties to narrow the scope of search.

If there is no significant difference in the degree of similarity among identification candidates and it is difficult to select a candidate, an $MS^n$ analysis with an increased value of n can be used. For example, when no appropriate candidate can be selected based on the degree of similarity obtained as a result of a comparison between a spectrum pattern formed by product ions based on the prediction of a single-stage dissociation pattern and an $MS^2$ spectrum obtained by an $MS^2$ analysis, it is possible to compare an $MS^3$ spectrum pattern obtained by an $MS^3$ analysis with a virtual database in which $MS^n$ spectra based on the prediction of the dissociation pattern of two or more stages are stored, and to select a candidate having a high degree of similarity or determine the order of candidates by their degrees of similarity. Naturally, it is possible to perform an $MS^n$ analysis with n equal to or greater than four.

Although an $MS^n$ spectrum is normally a representation of intensity information of product ions, the "$MS^n$ spectrum" in the context of the first through fourth aspects of the present invention may include a neutral fragment (neutral loss) eliminated from an ion in the dissociation process. A neutral loss corresponds to the difference in mass-to-charge ratio between a precursor ion and a product ion.

Effect of the Invention

With the method for mass spectrometry according to the first aspect of the present invention and the mass spectrometer according to the second aspect of the present invention, even when there is no database to be compared with a peak pattern of an $MS^n$ spectrum, it is possible to identify an unknown substance or grasp its chemical structure from a mass spectrum or $MS^n$ spectrum obtained by an actual measurement. There is no need to create an $MS^n$ spectrum database for an enormous number of compounds. It is also unnecessary to be concerned about a variation of $MS^n$ spectra due to the analyzing conditions or system configurations. Thus, the workload of both users and device makers for such tasks is reduced.

With the method for mass spectrometry according to the third aspect of the present invention and the mass spectrometer according to the fourth aspect of the present invention, even when a database to be compared with a peak pattern of an $MS^n$ spectrum cannot be created based on actual measurements, the virtual database created by computer-based calculation can be used to identify an unknown substance or grasp its chemical structure from a mass spectrum or $MS^n$ spectrum obtained by an actual measurement. There is no need to create an $MS^n$ spectrum database for an enormous number of compounds. It is also unnecessary to be concerned about a variation of $MS^n$ spectra due to the analyzing conditions or system configurations. Thus, the workload of both users and device makers for such tasks is reduced. Furthermore, since an enormous number of kinds of calculated $MS^n$ spectra that are difficult to be obtained by actual measurements are available for a database search, the probability of incomplete or incorrect identification is lowered and the accuracy of compound identification is improved.

BEST MODE FOR CARRYING OUT THE INVENTION

[First Embodiment]

Figure 1:
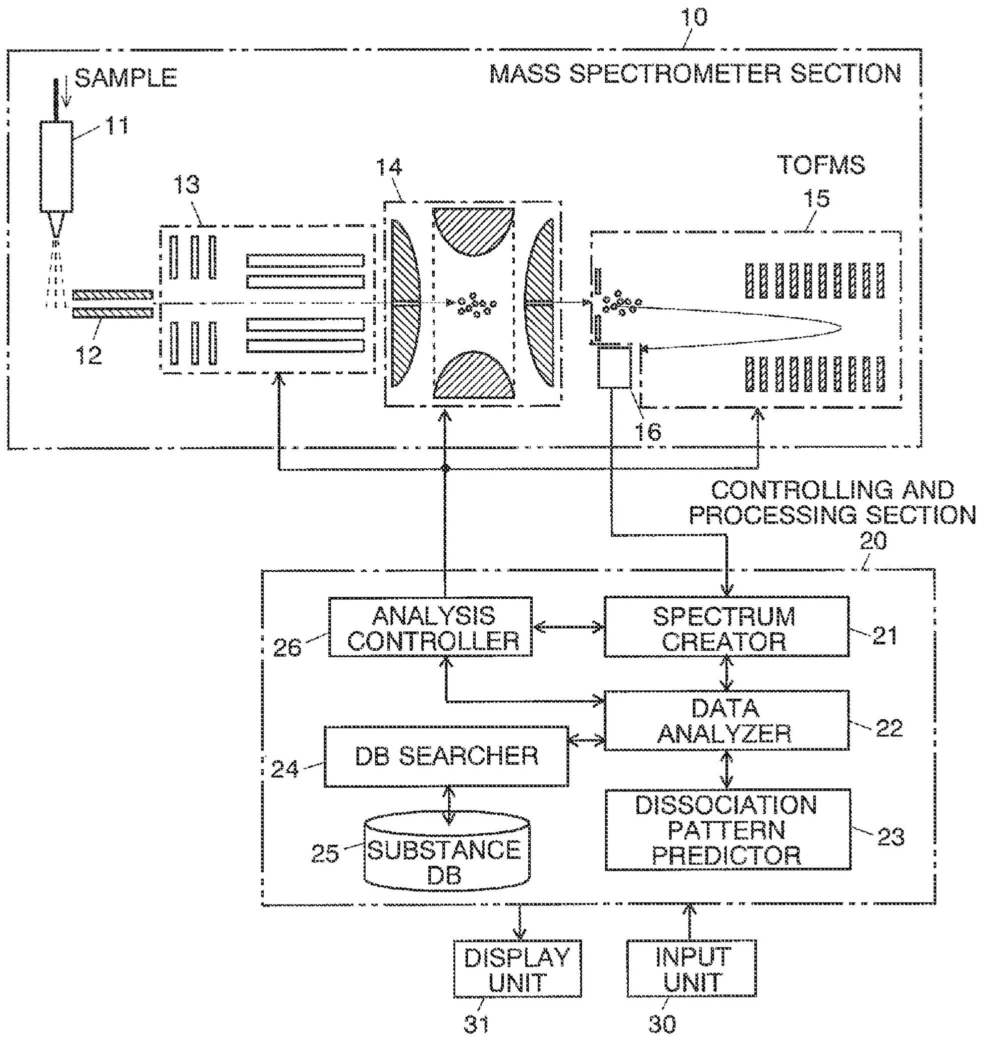
FIG. 1 is a schematic configuration diagram of a mass spectrometer according to the first embodiment of the present invention.

One embodiment (first embodiment) of the mass spectrometer for carrying out the method for mass spectrometry according to the present invention is hereinafter described with reference to the attached drawings. FIG. 1 is a schematic configuration diagram of the mass spectrometer according to the first embodiment.

In the mass spectrometer of the present embodiment, a mass spectrometer section 10 includes an ESI (electrospray ionization) ion source 11 for ionizing a substance in a liquid sample under atmospheric pressure, a heated capillary tube 12 for removing a solvent mixed in a generated ion stream and for guiding the ions into a vacuum chamber (not shown), an ion transport optical system 13 for sending ions to the subsequent stage while focusing them, a three-dimensional quadrupole ion trap 14, a time-of-flight mass spectrometer (TOFMS) 15 for mass-separating various ions ejected from the ion trap 14 according to their times of flight, and a detector 16 for detecting the mass-separated ions. Through the inlet of the ESI ion source 11, a normal liquid sample can be introduced. It is also possible to connect the exit of a column of a liquid chromatograph (LC) to the inlet to continuously introduce a liquid sample containing components separated by the LC. An APCI (atmospheric pressure chemical ionization) ion source or APPI (atmospheric pressure photoionization) ion source may also be used in place of the ESI ion source 11.

Detection signals produced by the detector 16 are sent to a processing and controlling section 20, where the signals are converted into digital data by an analogue-to-digital converter (not shown) and subsequently undergo a predetermined data processing. The processing and controlling section 20 includes a spectrum creator 21, a data analyzer 22, a dissociation pattern predictor 23, a database (DB) searcher 24, a substance database (DB) 25 and other functional components for the data processing, as well as an analysis controller 26 for controlling each component of the mass spectrometer section 10. An input unit 30 and a display unit 31 serving as a user interface are connected to the processing and controlling section 20. Most functions of the processing and controlling section 20 can be embodied by a personal computer in which a dedicated controlling and processing software program is installed.

Though not shown, a CID gas can be introduced into the ion trap 14 from the outside. After ions having a specific mass-to-charge ratio are selectively captured in the ion trap 14, a CID gas is introduced and a radio-frequency electric field is created to resonantly excite the captured ions, whereby the ions are made to collide with the CID gas and be dissociated. The selection of the ions having a specific mass-to-charge ratio and the CID operation can be repeated to dissociate the ions into smaller fragments in stages. That is to say, the present mass spectrometer is a mass spectrometer capable of an $MS^n$ analysis.

The substance database 25 is a registry of information about various compounds, such as the compound name, molecular weight, composition formula, and chemical structural formula of each compound. For example, "PubChem", which is a database managed by the National Center for Biotechnology Information and is available on the center's website for public access through the Internet. Naturally, this is not the only option for the substance database 25; it is possible to use another generally available database. An original database created by the user may also be used.

The dissociation pattern predictor 23 exhaustively predicts the dissociation (fragmentation) pattern of ions originating from a substance (compound) having a structure expressed by a given chemical structural formula. Existing software products can be used for this purpose, such as "ACD/MS Manager" or "ACD/MS Fragmenter" (offered by Advanced Chemistry Development, Inc.), "MassFragment" (offered by Waters Corporation), or "Fragment Identificator" (offered by University of Helsinki). Detailed information about these products is available on the websites of the respective companies or organizations.

Figure 2:
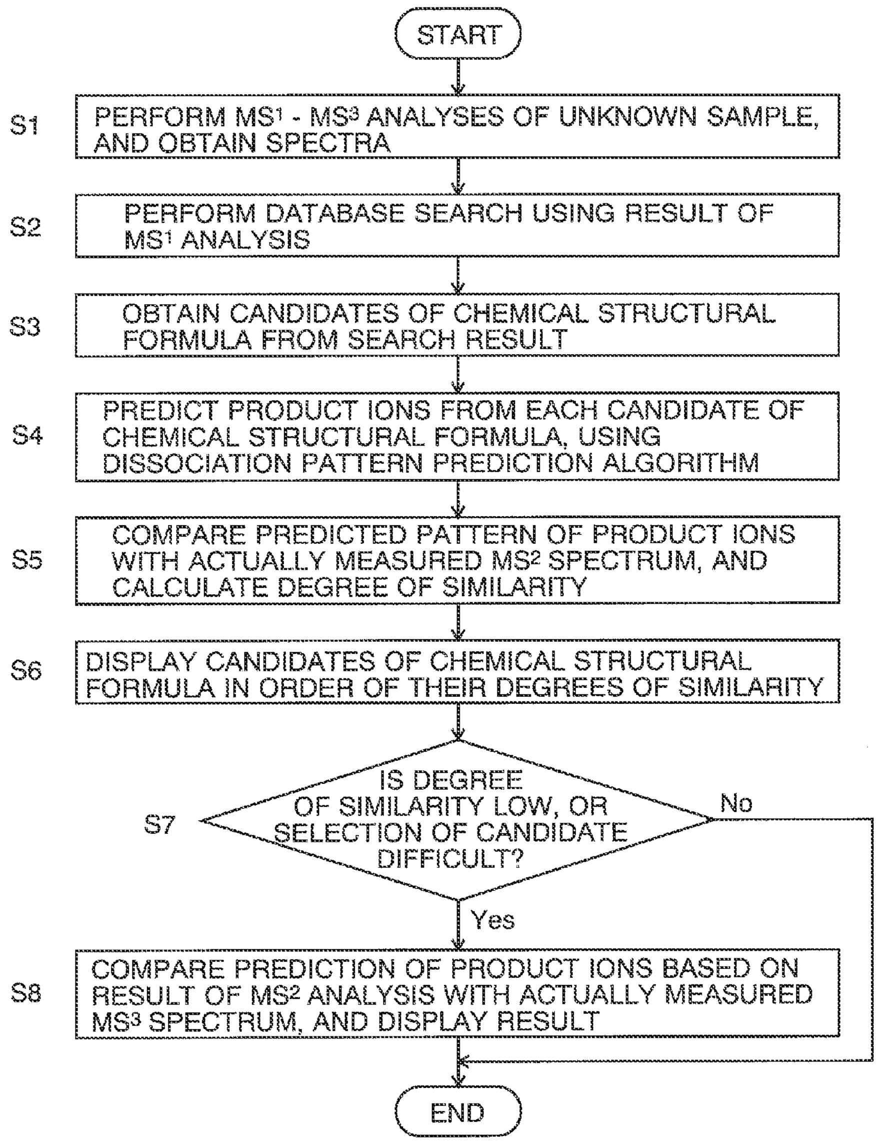
FIG. 2 is a flowchart showing a procedure of a substance identifying method characteristic of the mass spectrometer according to the first embodiment.
Figure 3:
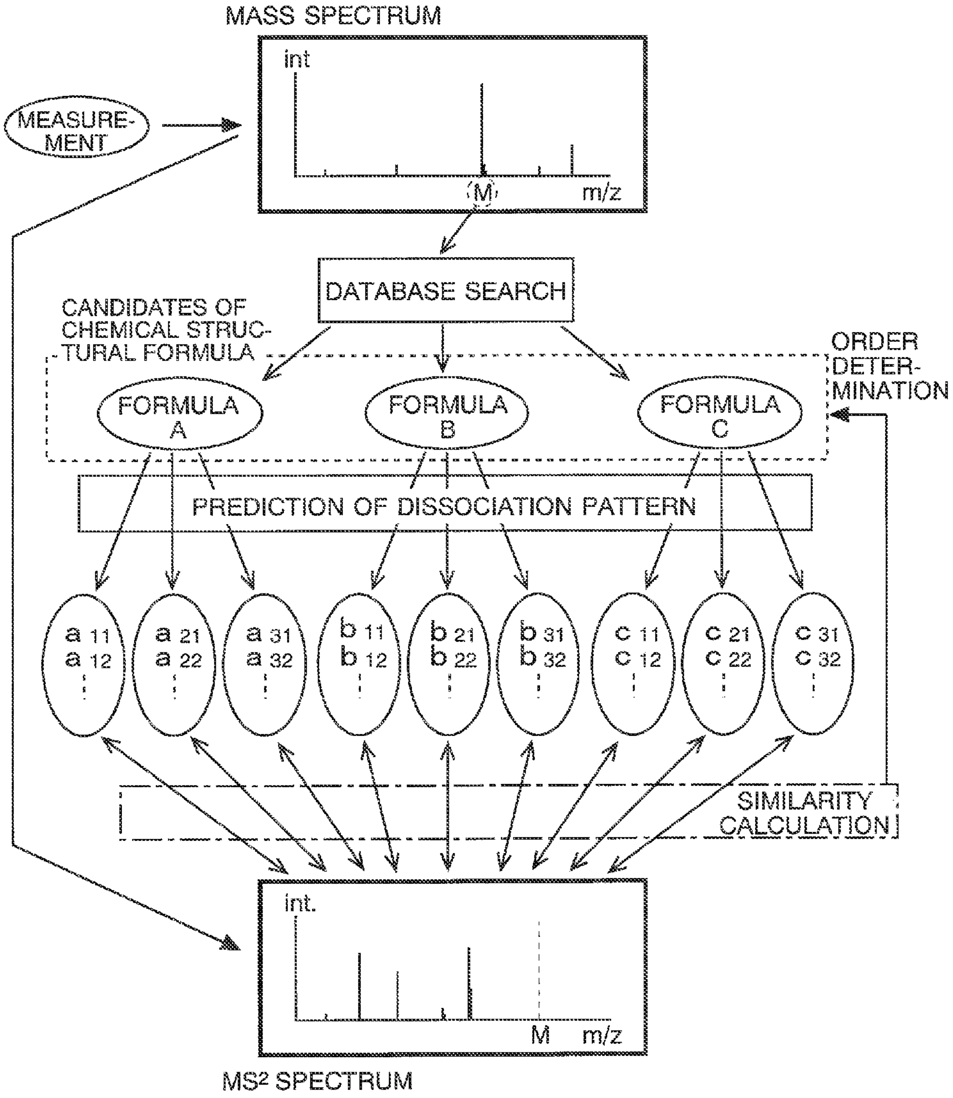
FIG. 3 is a model diagram showing one example of the substance identification process according to the flowchart of FIG. 2.

A method for identifying an unknown substance by the mass spectrometer of the present embodiment is hereinafter described according to FIGS. 2 and 3. FIG. 2 is a flowchart showing the procedure of the substance identification method, and FIG. 3 is a model diagram showing one example of the substance identification process according to the flowchart of FIG. 3.

When a user enters a command for initiating an analysis through the input unit 30, under the control of the analysis controller 26, the mass spectrometer section 10 performs $MS^1$ through $MS^3$ analyses of a test sample containing an unknown substance, and the spectrum creator 21 creates $MS^1$ through $MS^3$ spectra based on the detection signals obtained by those analyses (Step S1).

That is to say, in the mass spectrometer section 10, an $MS^1$ analysis of the test sample is initially performed, and the spectrum creator 21 creates an $MS^1$ (mass) spectrum from detection signals produced by the detector 16 in the $MS^1$ analysis. The data analyzer 22 detects a characteristic peak originating from the unknown substance of interest among the peaks on the $MS^1$ spectrum, and under the control of the analysis controller 26, the mass spectrometer section 10 performs an $MS^2$ analysis including a single-stage CID operation in which an ion corresponding to that peak is set as the precursor ion. Since the ESI ionization and ACPI ionization are so-called "soft" ionization, the largest portion of the ions tends to be produced by the addition or elimination of proton to or from a molecule. Therefore, the aforementioned characteristic peak is normally the peak having the highest signal intensity. However, if interfering components are previously known, the ions originating from such interfering components should be excluded before the ion having the highest peak is searched for.

Based on the detection signals obtained by the $MS^2$ analysis, the spectrum creator 21 creates an $MS^2$ spectrum. The data analyzer 22 detects a characteristic peak from the peaks on the $MS^2$ spectrum, and under the control of the analysis controller 26, the mass spectrometer section 10 performs an $MS^3$ analysis including two-stage CID operations in which an ion corresponding to the aforementioned peak is set as the precursor ion for the second-stage dissociation. Based on the detection signals obtained by the $MS^3$ analysis, the spectrum creator 21 creates an $MS^3$ spectrum.

After the $MS^1$ through $MS^3$ spectrum data are thus collected, the data analyzer 22 obtains the m/z value (or the corresponding composition formula) of the characteristic peak on the $MS^1$ spectrum (i.e. the precursor ion peak used for the $MS^2$ analysis), and the database searcher 24 compares the collected information with the substance database 25 to search for a chemical structural formula corresponding to the m/z value (or composition formula) (Steps S2 and S3). The m/z value used in this database search is given a certain numerical width to allow for the mass accuracy of the mass spectrometer and other factors. In general, there are two or more compounds which have approximately the same m/z value yet differ from each other in chemical structural formula. Accordingly, when a database having an enormous number of compounds registered therein, such as PubChem, is used, a plurality of chemical structural formulae will be extracted as the search result for one m/z value. In the example of FIG. 3, it is assumed that three mutually different chemical structural formulae "A", "B" and "C" have been found as a result of the database search for m/z=M. These are the candidates of the chemical structural formula.

After the candidates of the chemical structural formula have been chosen, the dissociation pattern predictor 23 predicts the fragmentation pattern for each candidate of the chemical structural formula, and based on the prediction result, the data analyzer 22 predicts product ions to be produced by an $MS^2$ analysis (Step S4). The dissociation pattern predictor 23 is given information about the actually used analyzing conditions, such as the ionization method, the positive/negative mode of ionization and the ionizing condition. These items of information help to narrow the range of prediction to some extent. In the example of FIG. 3, three sets of product ions are predicted for each of the three candidates A, B and C of the chemical structural formula. For example, three product-ion sets of $[a_{11}, a_{12}, \ldots]$, $[a_{21}, a_{22}, \ldots]$ and $[a_{31}, a_{32}, \ldots]$ are predicted for the chemical structural formula A. Similarly, three product-ion sets of $[b_{11}, b_{12}, \ldots]$, $[b_{21}, b_{22}, \ldots]$ and $[b_{31}, b_{32}, \ldots]$ are predicted for the chemical structural formula B, and three product-ion sets of $[c_{11}, c_{12}, \ldots]$, $[c_{21}, c_{22}, \ldots]$ and $[c_{31}, c_{32}, \ldots]$ are predicted for the chemical structural formula C. Accordingly, there are nine candidates in total of the peak pattern of the $MS^2$ spectrum for the substance in question.

Subsequently, the data analyzer 22 compares each of the predicted product-ion sets (or the peak patterns of the $MS^2$ spectrum predicted on the basis of these sets) with the peak pattern of the $MS^2$ spectrum obtained by the actual measurement in Step S1, and calculates a numerical value representing the degree of similarity between them based on the degree of matching in m/z and intensity (Step S5). Then, it determines the order of the candidates of the chemical structural formula according to the calculated degrees of similarity and displays them as an analysis result on the screen of the display unit 31 (Step S6). By visually checking the displayed information, the analysis operator can determine, for example, that the top-ranked chemical structural formula is the chemical structural formula of the substance in question.

When the numerical value itself of the highest degree of similarity is considerably low (more specifically, when it is lower than a previously specified threshold of the degree of similarity), or when there is no significant difference in the degree of similarity among a plurality of candidates of the chemical structural formula (e.g. when the difference in the degree of similarity is within a predetermined threshold) and it is impossible to determine which chemical structural formula should be chosen, the analysis operator can perform a predetermined operation through the input unit 30 to order the data analyzer 22 to continue the analyzing process.

That is to say, for each candidate of the chemical structural formula, the dissociation pattern predictor 23 predicts the second-stage dissociation pattern. Based on the prediction result, the data analyzer 22 predicts product ions to be produced in the $MS^3$ analysis, compares each of the predicted product-ion sets (or the peak patterns of the $MS^3$ spectrum predicted on the basis of these sets) with the peak pattern of the $MS^3$ spectrum obtained by the actual measurement in Step S1, and calculates a numerical value representing the degree of similarity between them based on the degree of matching in m/z and intensity. Based on the thus obtained degrees of similarity, the data analyzer 22 determines the order of the candidates of the chemical structural formula or extracts only a portion of the candidates, and displays the result on the screen of the display unit 31 (Step S8).

Even in the case where a specific chemical structural formula can be chosen with a high degree of similarity in the $MS^2$ spectrum, i.e. even when the result of determination in Step S7 is "No", it is still possible to perform the analyzing process in Step S8 and use the thereby obtained result to verify the identification which was performed using the $MS^2$ spectrum in Steps S5 and S6. This lowers the probability of an incorrect identification due to a coincidental match.

In the previous embodiment, the $MS^3$ spectrum data are collected in Step S1 before the data analyzing process is performed. If the result of determination in Step S7 is "No" and the entire process is directly discontinued, that $MS^3$ spectrum data will be a waste. This can be avoided by measuring only the $MS^1$ and $MS^2$ spectra of an unknown substance in Step S1, leaving the $MS^3$ spectrum of the unknown substance to be analyzed only when the result of determination in Step S7 has been "Yes." However, this method cannot be used in the case of initially collecting necessary spectrum data and subsequently analyzing those data by a batch process. The method is also difficult to use when the measurement requires a long period of time, as in the case of LC/MS. Therefore, it is normally preferable that the $MS^3$ spectrum also be obtained in Step S1.

In the previous embodiment, a previously provided substance database 25 is used to deduce the chemical structural formula of an unknown substance. However, for example, if the addition or elimination of specific components (e.g. addition of oxygen or elimination of methyl group) is known to easily occur, it is preferable to create and register a list of structural changes expected from such reactions, and to extend the scope of database search so as to cover modified chemical structural formulae that can be created by causing the listed structural changes on the chemical structural formulae registered in the substance database 25. This makes it possible to choose, as identification candidates, not only the compounds registered in the substance database 25 but also other chemical structural formulae similar to those compounds, whereby the accuracy of the deduction of the chemical structure of an unknown substance will be improved.

In the previous embodiment, it was assumed that a single $MS^2$ spectrum and a single $MS^2$ spectrum were obtained from a single unknown substance. However, for example, if a plurality of characteristic peaks are observed on the $MS^2$ spectrum, it is possible to perform an $MS^3$ analysis for each peak, using the ion corresponding to that peak as the precursor ion, and create a plurality of $MS^3$ spectra. In this case, it can be supposed that each of the obtained $MS^3$ spectra contains information of a different portion of the original substance. Such information allows the degree of similarity to be determined in a comprehensive way, e.g. by comparing the plurality of $MS^3$ spectra with the predicted two-stage dissociation patterns composed of different sets of product ions or integrating them with each other.

When there are a plurality of candidates of the chemical structural formula to be shown as an analysis result on the display unit 31, it is preferable to highlight their differences, e.g. by using specific colors to visually distinguish the portions having different chemical structures, or conversely, the portions having a common chemical structure, from the other portions. Such visual information is useful for analysis operators to deduce the structure of the substance.

In the database search for the chemical structural formula, it is possible to use not only the molecular weight or composition formula determined from the $MS^1$ spectrum of the unknown substance, but also other kinds of information relating to the target substance, in order to improve the searching accuracy. Such information can be obtained by performing a measurement of the unknown substance in the test sample with an analyzing apparatus different from mass spectrometers. For example, the acid dissociation constant (pKa), the water/octanol partition coefficient under neutral condition (LogP), the water/octanol partition coefficient at each pH (LogD), the water solubility, the boiling point, the vapor pressure, the u value (Hammett constant), and other physical properties can be used. With such additional information, the candidates of the chemical structural formula can be narrowed down, so that the identification and structural analysis of the substance can be performed with a high level of accuracy.

[Second Embodiment]

Figure 4:
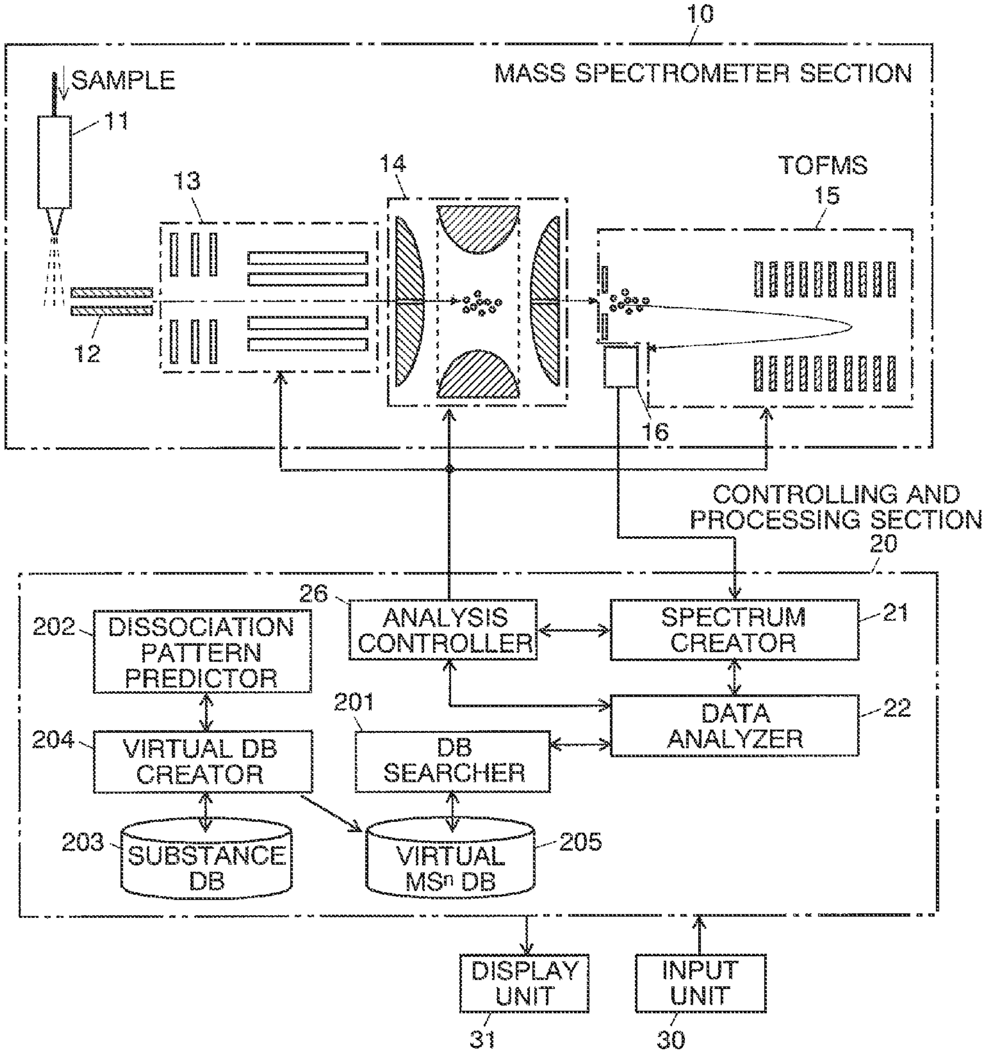
FIG. 4 is a schematic configuration diagram of a mass spectrometer according to the second embodiment of the present invention.

Another embodiment (second embodiment) of the mass spectrometer for carrying out the method for mass spectrometry according to the present invention is hereinafter described with reference to the attached drawings. FIG. 4 is a schematic configuration diagram of the mass spectrometer according to the second embodiment. The components identical or equivalent to those used in the first embodiment shown in FIG. 1 are denoted by the same numerals. In the mass spectrometer of the second embodiment, the configuration of the mass spectrometer section 10 is the same as the first embodiment.

Detection signals produced by the detector 16 are sent to a processing and controlling section 20, where the signals are converted into digital data by an analogue-to-digital converter (not shown) and subsequently undergo a predetermined data processing. The processing and controlling section 20 includes a spectrum creator 21, a data analyzer 22, a database (DB) searcher 201, a dissociation pattern predictor 202, a substance database (DB) 203, a virtual database (DB) creator 204, a virtual $MS^n$ database (DB) 205 and other functional components for the data processing, as well as an analysis controller 26 for controlling each component of the mass spectrometer section 10. An input unit 30 and a display unit 31 serving as a user interface are connected to the processing and controlling section 20. Most functions of the processing and controlling section 20 can be embodied by a personal computer in which a dedicated controlling and processing software program is installed.

Similar to the substance database 25 in the first embodiment, the substance database 203 is a registry of information about various compounds, such as the compound name, molecular weight, composition formula, and chemical structural formula of each compound. For example, "PubChem", which is a database managed by the National Center for Biotechnology Information and is available on the center's website for public access through the Internet, can be used. Naturally, this is not the only option for the substance database 203; it is possible to use another generally available database. An original database created by the user may also be used. The dissociation pattern predictor 202 has the same functions as the dissociation pattern predictor 23 in the first embodiment.

Figure 5:
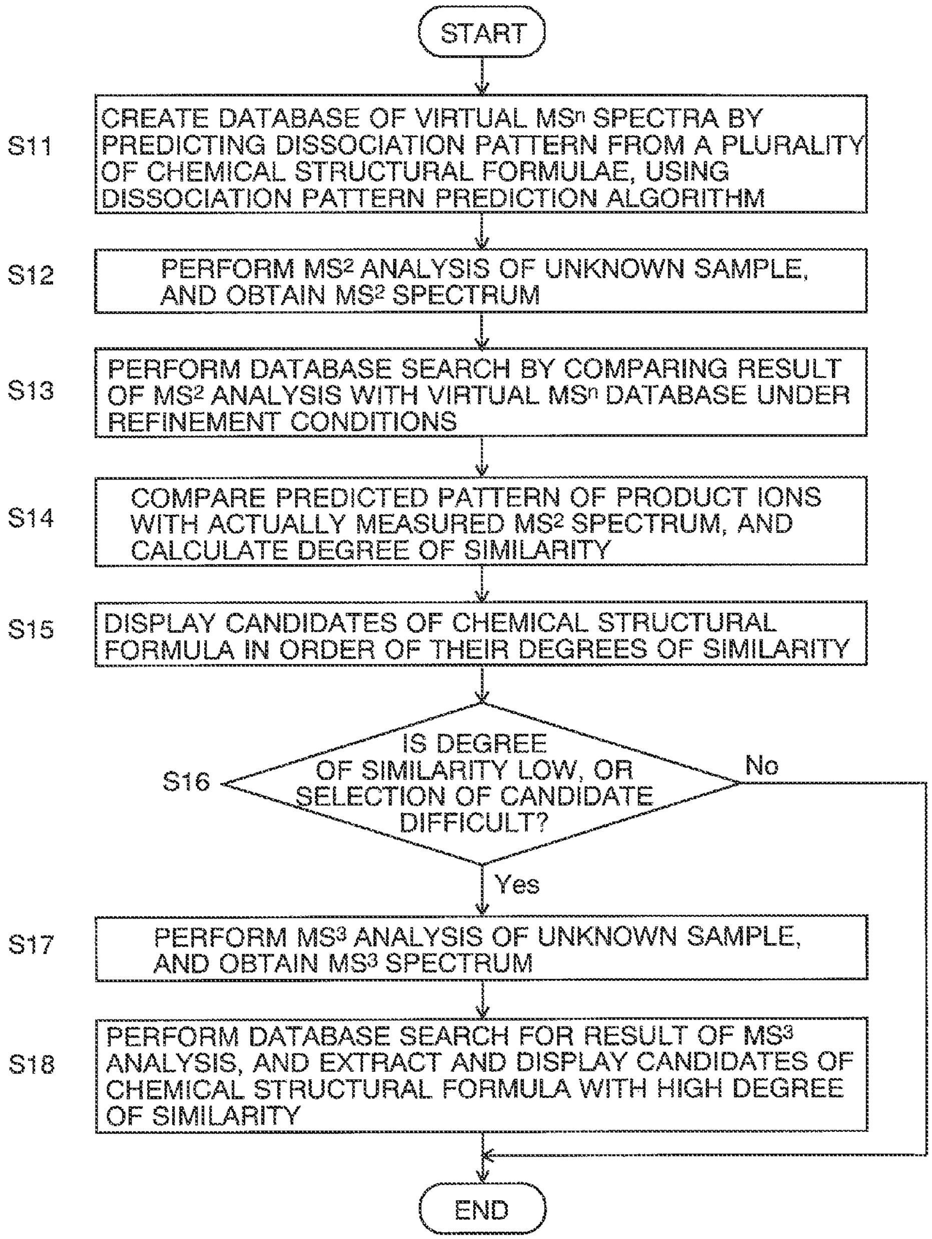
FIG. 5 is a flowchart showing a procedure of a substance identifying method characteristic of the mass spectrometer according to the second embodiment.

A method for identifying an unknown substance by the mass spectrometer of the second embodiment is hereinafter described according to the flowchart of FIG. 5.

When a user enters a command for creating a virtual database through the input unit 30, the virtual database creator 204 sequentially retrieves each of the chemical structural formulae of the compounds registered in the substance database 203 and relays it to the dissociation pattern predictor 202. The dissociation pattern predictor 202 predicts the fragmentation pattern for each of those chemical structural formulae. Based on the prediction result, the virtual database creator 204 predicts product ions to be produced in an $MS^2$ analysis, and creates an $MS^2$ spectrum. In the present case, unlike the first embodiment, no restriction on the analyzing conditions, such as the ionization method, the positive/negative mode of ionization, and the ionizing condition, is imposed when the dissociation pattern predictor 202 predicts the dissociation pattern. Accordingly, a plurality of (normally, a number of) dissociation patterns will be predicted from one chemical structural formula, and hence a plurality of $MS^2$ spectra for one chemical structural formula. The dissociation pattern predictor 202 predicts not only the pattern of single-stage dissociation but also the patterns of multi-stage dissociations in which a product ion produced by the first dissociation is further dissociated into different product ions. The virtual database creator 204 also creates $MS^2$ spectra based on the results of such predictions.

The number of stages of the dissociation to be predicted can be appropriately specified. In the present case, at least the dissociation patterns of up to the second stage are predicted and a computational $MS^3$ spectrum is created, since it is in some cases necessary to determine the similarity in the pattern of $MS^3$ spectra, as will be described later. Accordingly, a number of $MS^n$ spectra will normally be created for one chemical structural formula, and the number of $MS^n$ spectra created for all the compounds registered in the substance database 203 will be enormous. In the virtual $MS^n$ database 205, the data constituting each of such $MS^n$ spectra are stored and related to the chemical structural formula, the name or other information of the compound from which the data has been derived, (Step S11).

Subsequently, when a user enters a command for initiating an analysis through the input unit 30, $MS^1$ and $MS^2$ analyses of a test sample containing an unknown substance are performed in the mass spectrometer section 10 under the control of the analysis controller 26, and the spectrum creator 21 creates $MS^1$ and $MS^2$ spectra based on the detection signals obtained by those analyses (Step S12). That is to say, in the mass spectrometer section 10, an $MS^1$ analysis of the test sample is initially performed, and the spectrum creator 21 creates an $MS^1$ spectrum from detection signals produced by the detector 16 in the $MS^1$ analysis. The data analyzer 22 detects a characteristic peak originating from the unknown substance of interest among the peaks on the $MS^1$ spectrum, and under the control of the analysis controller 26, the mass spectrometer section 10 performs an $MS^2$ analysis including a single-stage CID operation in which the ion corresponding to that peak is set as the precursor ion. Since the ESI ionization and the ACPI ionization are so-called "soft" ionization, the largest portion of the ions tends to be produced by the addition or elimination of a proton to or from a molecule. Therefore, the aforementioned characteristic peak is normally the peak having the highest signal intensity. However, if interfering components are previously known, the ions originating from such interfering components should be excluded before the ion having the highest peak is searched for. Based on the detection signals obtained by the $MS^2$ analysis, the spectrum creator 21 creates an $MS^2$ spectrum.

After the $MS^1$ and $MS^2$ spectra are obtained by actual measurements, the database searcher 201 performs a database search by comparing the peak pattern of the actually measured $MS^2$ spectrum with the virtual $MS^n$ database 205 under previously given refinement conditions, and lists candidates of the chemical structural formula of the unknown substance (Step S13). As the refinement conditions, for example, it is possible to use the isotope distribution, a partial composition formula or structural formula, the kinds and numbers of constituent elements, a mass defect, the pattern of bonding or dissociation, the dissociating conditions, and physical properties measured with a different type of analyzing apparatus. In the case where a liquid chromatograph or gas chromatograph is connected to the inlet side of the mass spectrometer section 10, the elution time (retention time) in the chromatograph may also be used as a refinement condition.

In the refinement using the isotope distribution, the search result is refined, for example, by imposing the condition that isotopic peaks originating from the same substance ion should be present, or that the ratios of the signal intensities of a plurality of peaks which are likely to be isotopic peaks originating from the same substance ion should be within a predetermined range. In the refinement by the mass defect, a certain allowable width is set for the under-decimal-point part of the molecular weight calculated from the m/z value of the peak on the $MS^1$ spectrum, and a compound (structural formula) having a molecular weight whose under-decimal-point part falls within the aforementioned allowable width of the molecular weight is selected. As already noted, examples of the physical properties measured with a different type of analyzing apparatus include the acid dissociation constant (pKa), the water/octanol partition coefficient under neutral condition (LogP), the water/octanol partition coefficient at each pH (LogD), the water solubility, the boiling point, the vapor pressure and the σ value (Hammett constant).

If the aforementioned physical properties are stored in the substance database 203, it is possible to narrow down the compounds by comparing a physical property obtained by an actual measurement of the unknown substance in the test sample by an appropriate analyzing apparatus different from mass spectrometers, with the physical properties registered in the substance database 203. However, if the substance database 203 is a database commonly used for mass spectrometry, the aforementioned physical properties may not be originally contained in it, because those kinds of information are not directly related to mass spectrometry. Even in such a case, at least a portion of those physical properties can be determined from structural formulae by known methods (e.g. by using theoretical equations), so that the compounds can be narrowed down by comparing a physical property determined from the structural formula of each compound stored in the substance database 203 with a physical property obtained by an actual measurement of the unknown substance. This also holds true for the first embodiment.

The refinement conditions may be manually set by users through the input unit 30. Some refinement conditions which can be derived from a result of an $MS^1$ analysis, such as the mass defect, may be automatically set based on the result of the analysis.

While narrowing the scope of search based on the refinement conditions, the database searcher 201 compares the peak pattern of the $MS^2$ spectrum obtained by the actual measurement with the peak patterns of the $MS^2$ spectra registered in the virtual $MS^n$ database 205, and calculates a numerical value representing the degree of similarity between them based on the degree of matching in m/z and intensity (Step S14). Then, the data analyzer 22 determines the order of the candidates of the chemical structural formula according to the calculated degrees of similarity and displays them as an analysis result on the screen of the display unit 31 (Step S15). By visually checking the displayed result, the analysis operator can determine, for example, that the top-ranked chemical structural formula is the chemical structural formula of the substance in question.

When the numerical value of the upper-most degree of similarity is still considerably low (more specifically, when it is lower than a previously specified threshold of the degree of similarity), or when there is no significant difference in the degree of similarity among a plurality of different candidates of the chemical structural formula (e.g. when the difference in the degree of similarity is within a predetermined threshold) and it is impossible to determine which chemical structural formula should be chosen, the analysis operator can perform a predetermined operation through the input unit 30, whereupon the mass spectrometer section 10 performs an $MS^2$ analysis of the test sample containing the unknown substance under the control of the analysis controller 26, and the spectrum creator 21 creates an $MS^3$ spectrum based on the detection signals obtained by the analysis (Step S17). That is to say, a characteristic product ion is selected as the precursor ion from the product ions produced by the $MS^2$ analysis, and an $MS^3$ analysis is performed. Similar to the first embodiment, it is also possible in the second embodiment to obtain not only the $MS^2$ spectrum but also the $MS^3$ spectrum in Step S12, i.e. when the actual measurement of the test sample containing the unknown substance is performed.

In any case, after the actually measured $MS^3$ spectrum is obtained, the processes similar to Steps S13-S15 are subsequently performed. That is to say, a database search using the virtual $MS^n$ database 205 as the reference is performed by the database searcher 201 under the given refinement conditions, and candidates of the chemical structural formula with high degrees of similarity are extracted and displayed as an analysis result on the screen of the display unit 31 in order of their degrees of similarity (Step S18). By visually checking the displayed result, the analysis operator can determine, for example, that the top-ranked chemical structural formula is the chemical structural formula of the substance in question.

Even in the case where a specific chemical structural formula can be chosen with a high degree of similarity in the $MS^2$ spectrum, i.e. even when the result of determination in Step S16 is "No", it is still possible to perform the processes of Steps S17 and 18, and to use the thereby obtained result to verify the identification which was performed using the $MS^2$ spectrum. This lowers the probability of an incorrect identification due to a coincidental match.

In the second embodiment, the dissociation pattern of an ion originating from an original substance is predicted from the chemical structural formulae of the compounds registered in the previously provided substance database 203. However, for example, if the addition or elimination of specific components (e.g. addition of oxygen or elimination of methyl group) is known to easily occur, it is preferable to create and register a list of structural changes expected from such reactions, and to extend the range of prediction of the dissociation pattern so as to cover modified chemical structural formulae that can be created by causing the listed structural changes on the chemical structural formulae registered in the substance database 203. This makes it possible to choose, as identification candidates, not only the compounds registered in the substance database 203 but also other chemical structural formulae similar to those compounds, whereby the accuracy of deducing the chemical structure is improved.

If, for example, a plurality of characteristic peaks are observed on the $MS^1$ spectrum, allowing more than one $MS^2$ spectrum and more than one $MS^3$ spectrum to be obtained from a single unknown substance, then it is possible to perform, in Step S12, an $MS^2$ analysis for each peak, using the ion corresponding to that peak as the precursor ion, and create a plurality of $MS^2$ spectra. In this case, it can be supposed that each of the thus obtained $MS^2$ spectra contains information of a different partial structure of the original unknown substance. Such information allows the degree of similarity to be determined in a comprehensive way, e.g. by comparing the results of the database searches conducted for the actually measured $MS^2$ spectra or integrating them with each other.

When there are a plurality of candidates of the chemical structural formula to be shown as an analysis result on the display unit 31, it is preferable to highlight their differences, e.g. by using specific colors so that the portions having different chemical structures, or conversely, the portions having a common chemical structure, can be visually distinguished from the other portions. Such visual information is useful for analysis operators to deduce the structure of the substance.

In the system of the second embodiment shown in FIG. 4, although the virtual database creator 204 creates the virtual $MS^n$ database 205 separately from the existing substance database 203, the virtual $MS^n$ database 205 may practically be incorporated into the substance database 203. More specifically, in the process of Step S11, after an $MS^n$ spectrum is created from a dissociation pattern predicted from the chemical structural formula of a compound registered in the substance database 203, the $MS^n$ spectrum data may be stored in a predetermined field in the substance database 203 and related to the compound for which the prediction has been made. As a result, a database which is practically the same as the virtual $MS^n$ database 205 is created in the substance database 203.

The first and second embodiments are mere examples of the present invention. It is evident that any modification, change or addition appropriately made within the spirit of the present invention will fall within the scope of claims of the present patent application.

EXPLANATION OF NUMERALS

10 . . . Mass Spectrometer Section
11 . . . ESI Ion Source
12 . . . Heated Capillary Tube
13 . . . Ion Transport Optical System
14 . . . Ion Trap
15 . . . Time-of-Flight Mass Spectrometer (TOFMS)
16 . . . Detector
20 . . . Processing and Controlling Section
21 . . . Spectrum Creator
22 . . . Data Analyzer
23, 202 . . . Dissociation Pattern Predictor
24, 201 . . . Database Searcher
25, 203 . . . Substance Database
26 . . . Analysis Controller
204 . . . Virtual Database Creator
205 . . . Virtual $MS^n$ Database
30 . . . Input Unit
31 . . . Display Unit

The invention claimed is:

1. A method for mass spectrometry for an identification and/or structural analysis of an unknown substance using a mass spectrometer capable of obtaining an $MS^n$ spectrum by performing an $MS^n$ analysis in which an ion originating from a substance to be analyzed is dissociated in n-1 stages (where n is an integer equal to or greater than two), comprising:

a) a structural formula deduction step, in which a chemical structural formula of an unknown substance is deduced based on a molecular weight of the unknown substance determined from a mass spectrum obtained by performing a mass spectrometry of the unknown substance or on a composition formula deduced from the molecular weight;

b) a dissociation state deduction step, in which a production to be detected in an $MS^n$ analysis of the unknown substance is deduced by predicting a dissociation pattern of an ion originating from the unknown substance based on the chemical structural formula deduced in the structural formula deduction step; and c) an evaluation step, in which a spectrum pattern formed by the product ion deduced in the dissociation state deduction step and an $MS^n$ spectrum obtained by performing an $MS^n$ analysis of the unknown substance are compared, and a degree of reliability of the deduction of the chemical structural formula by the structural formula deduction step is evaluated based on a similarity between the spectrum pattern and the $MS^n$ spectrum, wherein in the evaluation step, the spectrum pattern formed by the product ion based on a prediction of the dissociation pattern with an increased value of n and an $MS^n$ spectrum obtained by an actual $MS^n$ analysis are compared, and the evaluation of the reliability of a previously conducted deduction of the chemical structural formula is verified based on the similarity between the spectrum pattern and the $MS^n$ spectrum.

2. The method for mass spectrometry according to claim 1, wherein:

in the structural formula deduction step, a database having chemical structural information of various compounds registered therein is used to determine the chemical structural formula corresponding to the molecular weight or the composition formula of the unknown substance.

3. The method for mass spectrometry according to claim 2, wherein:

a plurality of candidates of the chemical structural formula are determined in the structural formula deduction step; and in the evaluation step, an index value of the similarity is calculated for each of the candidates of the chemical structural formula, and an order of the candidates of the chemical structural formula is determined based on their index values.

4. The method for mass spectrometry according to claim 3, wherein:

if the index value calculated in the evaluation step is low, the spectrum pattern formed by the product ion based on a prediction of the dissociation pattern with an increased value of n and an $MS^n$ spectrum obtained by an actual $MS^n$ analysis are compared, and the degree of reliability of the deduction of the chemical structural formula is verified based on the similarity between the spectrum pattern and the $MS^n$ spectrum.

5. A mass spectrometer capable of obtaining an $MS^n$ spectrum by performing an $MS^n$ analysis in which an ion originating from a substance to be analyzed is dissociated in n-1 stages (where n is an integer equal to or greater than two), and in which an identification and/or structural analysis of an unknown substance is performed by using a mass spectrum obtained by a mass spectrometry of the unknown substance and an $MS^n$ spectrum obtained by performing an $MS^n$ analysis of the same unknown substance, comprising:

a) a structural formula deduction unit for deducing a chemical structural formula of an unknown substance based on a molecular weight of the unknown substance determined from a mass spectrum obtained by an actual measurement of the unknown substance or on a composition formula deduced from the molecular weight;

b) a dissociation state deduction unit for deducing a product ion to be detected in an $MS^n$ analysis of the unknown substance, by predicting a dissociation pattern of an ion originating from the unknown substance based on the chemical structural formula deduced by the structural formula deduction unit; and c) an evaluation unit for comparing a spectrum pattern formed by the product ion deduced by the dissociation state deduction unit and an $MS^n$ spectrum obtained by an actual measurement of the unknown substance, and for evaluating a degree of reliability of the deduction of the chemical structural formula by the structural formula deduction unit, based on a similarity between the spectrum pattern and the $MS^n$ spectrum, wherein in the evaluation step, the spectrum pattern formed by the product ion based on a prediction of the dissociation pattern with an increased value of n and an $MS^n$ spectrum obtained by an actual $MS^n$ analysis are compared, and the evaluation of the reliability of a previously conducted deduction of the chemical structural formula is verified based on the similarity between the spectrum pattern and the $MS^n$ spectrum.

6. A method for mass spectrometry for an identification and/or structural analysis of an unknown substance using a mass spectrometer capable of obtaining an $MS^n$ spectrum by performing an $MS^n$ analysis in which an ion originating from a substance to be analyzed is dissociated in n-1 stages (where n is an integer equal to or greater than two), comprising:

a) a virtual database creation step, in which a dissociation pattern is predicted based on a plurality of chemical structural formulae of various kinds of substances to determine an $MS^n$ spectrum pattern to be obtained as a result of an $MS^n$ analysis of each substance, and the obtained $MS^n$ spectrum pattern is held in a database; and b) a candidate extraction step, in which a spectrum pattern of an $MS^n$ spectrum obtained by performing an $MS^n$ analysis of an unknown substance is compared with a virtual database held by the virtual database creation step under a previously set refinement condition, and a chemical structural formula having a high degree of similarity is extracted as an identification candidate of the unknown substance.

7. The method for mass spectrometry according to claim 6, wherein:

in the virtual database creation step, a database having chemical structural information of various compounds registered therein is used in such a manner that an $MS^n$ spectrum pattern is predicted for each compound registered in the database, and the virtual database is created using the predicted spectrum pattern.

8. The method for mass spectrometry according to claim 7, wherein:

in the virtual database creation step, an $MS^n$ spectrum pattern is predicted for each compound in an original database having chemical structural information of various compounds registered therein, and either the predicted spectrum pattern itself or information obtained from the spectrum pattern is additionally registered in the original database and related to the original compound.

9. The method for mass spectrometry according to claim 6, wherein:

the refinement condition is at least one of a group of an isotope distribution, a partial composition formula or structural formula, kinds and numbers of constituent elements, and a mass defect filter.

10. The method for mass spectrometry according to claim 6, wherein:

the refinement condition is a physical property of a compound other than a mass or mass-to-charge ratio.

11. The method for mass spectrometry according to claim 10, wherein:

the physical property used as the refinement condition in the identification of the unknown substance is obtained by a calculation from structural formulae registered as chemical structural information of various compounds.

12. A mass spectrometer capable of obtaining an $MS^n$ spectrum by performing an $MS^n$ analysis in which an ion originating from a substance to be analyzed is dissociated in n-1 stages (where n is an integer equal to or greater than two), and in which an identification and/or structural analysis of an unknown substance is performed by using a mass spectrum obtained by a mass spectrometry of the unknown substance and an $MS^n$ spectrum obtained by performing an $MS^n$ analysis of the same unknown substance, comprising:

a) a virtual database creator for predicting a dissociation pattern based on a plurality of chemical structural formulae of various kinds of substances to determine an $MS^n$ spectrum pattern to be obtained as a result of an $MS^n$ analysis of each substance, and for holding the obtained $MS^n$ spectrum pattern in a database; and b) a candidate extractor for comparing a spectrum pattern of an $MS^n$ spectrum obtained by performing an $MS^n$ analysis of an unknown substance, with a virtual database held by the virtual database creator, under a previously set refinement condition, and for extracting, as an identification candidate of the unknown substance, a chemical structural formula having a high degree of similarity.

* * * * *